United States Patent
Wu et al.

(10) Patent No.: US 9,396,096 B2
(45) Date of Patent: Jul. 19, 2016

(54) ANDROID AUTOMATED CROSS-APPLICATION TESTING DEVICE AND METHOD

(71) Applicant: BORQS WIRELESS LTD., Beijing (CN)

(72) Inventors: Jin Wu, Beijing (CN); Hui Zhao, Beijing (CN); Wei Ding, Beijing (CN)

(73) Assignee: Borqs Wireless Ltd., Beijing (CN)

( * ) Notice: Subject to any disclaimer, the term of this patent is extended or adjusted under 35 U.S.C. 154(b) by 233 days.

(21) Appl. No.: 14/325,101

(22) Filed: Jul. 7, 2014

(65) Prior Publication Data

US 2014/0325282 A1   Oct. 30, 2014

Related U.S. Application Data

(63) Continuation of application No. PCT/CN2012/083954, filed on Nov. 2, 2012.

(30) Foreign Application Priority Data

Jul. 24, 2012  (CN) .......................... 2012 1 0256711

(51) Int. Cl.
G06F 11/00 (2006.01)
G06F 11/36 (2006.01)

(52) U.S. Cl.
CPC ........ *G06F 11/3676* (2013.01); *G06F 11/3672* (2013.01); *G06F 11/3692* (2013.01)

(58) Field of Classification Search
CPC . G06F 11/3676; G06F 11/3672; G06F 11/36; G06F 11/362; G06F 11/3664; G06F 11/3668; G06F 11/3688; G06F 11/3692; G06F 11/3696
See application file for complete search history.

(56) References Cited

PUBLICATIONS

Kropp, Martin, and Pamela Morales. "Automated GUI testing on the Android platform." In Proceedings of the 22nd IFIP International Conference on Testing Software and Systems: Short Papers (Oct. 2010), pp. 67-72.*

Hu, Cuixiong, and Iulian Neamtiu. "Automating GUI testing for Android applications." In Proceedings of the 6th International Workshop on Automation of Software Test, pp. 77-83. ACM, 2011.*

Li, Juanru, Wenbo Yang, Junliang Shu, Yuanyuan Zhang, and Dawu Gu. "InDroid: An Automated Online Analysis Framework for Android Applications.".*

(Continued)

*Primary Examiner* — Bryce Bonzo
*Assistant Examiner* — Anthony J Amoroso
(74) *Attorney, Agent, or Firm* — Knobbe, Martens, Olson & Bear, LLP

(57) ABSTRACT

The present disclosure provides an Android automated cross-application testing device and method. The device comprises a primary application testing unit, a trigger monitoring unit, a secondary application testing control unit, a secondary application testing unit, a secondary application test result recording unit, a library file storage unit, a primary application test checking unit, a test result processing unit, and a test result output unit. The method comprises monitoring the starting of a secondary application in the primary application testing process; testing the secondary application and collecting and processing the test result of the secondary application; and continuing the test of the primary application. If the test of the secondary application is successful, the above steps are repeated until the test of the primary application is completed. The method further comprises terminating the test of the primary application if the test of the secondary application times out or fails.

7 Claims, 3 Drawing Sheets

(56) References Cited

PUBLICATIONS

R. Mahmood, N. Esfahani, T. Kacem, N. Mirzaei, S. Malek and A. Stavrou, "A whitebox approach for automated security testing of Android applications on the cloud," Automation of Software Test (AST), 2012 7th International Workshop on, Zurich, 2012, pp. 22-28.*

Selvam, R., and V. Karthikeyani. "Mobile Software Testing—Automated Test Case Design Strategies." International Journal on Computer Science and Engineering 3.4 (2011): pp. 1450-1461.*

* cited by examiner

ANDROID AUTOMATED CROSS-APPLICATION TESTING DEVICE AND METHOD

CROSS-REFERENCE TO RELATED APPLICATIONS

This application is a continuation of International Patent Application No. PCT/CN2012/083954, filed on Nov. 2, 2012, which claims foreign priority from CN 201210256711.6, filed on Jul. 24, 2012, the disclosures of each of which are incorporated herein by reference in their entirety.

BACKGROUND

1. Field

The present disclosure relates to an application testing device and method. In particular, the present disclosure relates to an Android automated cross-application testing device and method.

2. Description of the Related Art

Android is a Linux-based open-source operating system, which is mainly used in portable devices. At present, there is a testing framework called "Instrumentation" in Android, which is an automated testing tool that has no graphical interface, has starting capability, and is designed to monitor other tested applications. The testing framework starts up a set of tests mainly by means of command line (e.g., adb shell), and provides the test results in the form of command line. The main working principle of the testing framework is as follows: Instrumentation is in active state when applications run; Instrumentation is initialized before any application runs, which can be used to monitor the interaction between the system and applications. Instrumentation starts up the tests by means of command line (e.g., adb shell). If the tested application has started up and exists in the memory, Instrumentation will kill the tested application, and then restart the tested application. Thus, Instrumentation coexists with the tested application in the same process, and thereby attains the purpose of manipulating and monitoring the tested application.

Though the testing application can control applications accurately in the Instrumentation framework, when the tested primary application invokes a secondary application in the test, the Instrumentation object cannot manipulate or monitor the secondary application because the secondary application is not in the same process as the primary application after the secondary application is started up. In other words, the Instrumentation framework does not support cross-application testing.

SUMMARY

Technical Problem

To overcome the drawbacks in prior systems, the present disclosure provides an Android automated cross-application testing device and method, which can implement automated cross-application testing and testing scenarios with complex interaction on the basis of the Instrumentation framework on Android platform. The tested primary applications can trigger several secondary applications, and interaction and switchover among the applications can be implemented.

Technical Solution

To attain the object described above, the present disclosure provides an Android automated cross-application testing device. The Android automated cross-application testing device comprises a primary application testing unit, a trigger monitoring unit, a secondary application testing control unit, a secondary application testing unit, a secondary application test result recording unit, a library file storage unit, a primary application test checking unit, a test result processing unit, and a test result output unit.

The primary application testing unit is configured to test the primary application, collect the test result of the primary application, and trigger and start up secondary applications in the testing process.

The trigger monitoring unit is configured to monitor the triggering and starting up of secondary applications in the primary application testing process.

The secondary application testing control unit is configured to control the testing process of a secondary application.

The secondary application testing unit is configured to test a secondary application and subordinate applications, and collect the test results of the applications.

The secondary application test result recording unit is configured to record and save the test results of the secondary applications or subordinate applications.

The library file storage unit is configured to store a cross-application Method Library of Test Runner Enhancement Framework Open Innovative Layout.

The primary application test checking unit is configured to check the test results in the records of secondary applications or subordinate applications.

The test result processing unit is configured to process the test result of the primary application.

The test result output unit is configured to output the test result of the primary application collected by the primary application testing unit in the form of a test report.

When the trigger monitoring unit detects a secondary application is triggered and started up in the primary application testing process, the secondary application testing control unit may control a secondary application testing unit to test the secondary application.

The cross-application Method Library of Test Runner Enhancement Framework Open Innovative Layout provides an external interface of Test Runner Enhancement Framework Open Innovative Layout to implement the functions of the trigger monitoring unit, the secondary application testing control unit, the secondary application testing unit, and the secondary application test result recording unit.

To attain the object described above, the present disclosure provides an Android automated cross-application testing method that comprises the following:

1) monitoring the starting up of a secondary application in the primary application testing process;
2) testing the secondary application, collecting, and processing the test result of the secondary application;
3) continuing the test of the primary application if the test of the secondary application is successful;
4) repeating above steps until the test of the primary application is completed; and
5) terminating the test of the primary application if the test of the secondary application times out or fails.

In step 1), the starting up of a secondary application is monitored in the primary application testing process by starting up a Test Runner Enhancement Framework Open Innovative Layout Instrumentation process by means of command line.

In step 2), the test of the secondary application further comprises the following:

a) injecting the secondary application into the Test Runner Enhancement Framework Open Innovative Layout Instrumentation so that the status of the secondary application is tracked in the entire process by the Test Runner Enhancement Framework Open Innovative Layout Instrumentation;
b) starting a thread Test Runner Enhancement Framework Open Innovative Layout Test Runner, acquiring the Activity object of the secondary application and the testing environment of Test Runner Enhancement Framework Open Innovative Layout Instrumentation, and collecting the test result of the secondary application;
c) creating a Test Runner Enhancement Framework Open Innovative Layout Base Test Runner object and running a test case of the secondary application;
d) transmitting the testing environment of Test Runner Enhancement Framework Open Innovative Layout in the secondary application to the test case of the secondary application in a Test Runner Enhancement Framework Open Innovative Layout Test Case; and
e) completing the test of the secondary application, recording the test result of the secondary application, and continuing the test of the primary application.

In step 2), the procedure of collecting and processing the test result of the secondary application comprises the following:
a) outputting the test result of the secondary application as "Timeout" and terminating the test of the primary application if the test result of the secondary application is not generated within a specified time; and
b) terminating the test of the primary application if the test result of the secondary application is "Failed."

In the present disclosure, on the basis of the starting mechanism of an active window (Activity) on the Android platform and the binding dependency between Activity and Instrumentation, the Test Runner Enhancement Framework Open Innovative Layout Instrumentation (TrefoilInstrumentation) framework monitors the real-time status of the tested application. When the tested application starts up, the Activity object of the current application is intercepted so that automated manipulation of the interface of the tested application is implemented. At the same time, the Activity object managed by TrefoilInstrumentation is transmitted to a Test Case object and the entire operational process is encapsulated into a Test Suite and managed by a Test Runner centrally. In that way, automated cross-application testing and testing scenarios with complex interaction on the basis of Instrumentation framework can be implemented on the Android platform.

Hereunder, other characteristics and advantages of the present disclosure will be described and will become apparent partially in the description or can be understood clearly from the description of some embodiments.

BRIEF DESCRIPTION OF THE DRAWINGS

The accompanying drawings are used to provide further understanding of the present disclosure, and constitute a part of the description. These drawings are used in conjunction with the embodiments to interpret the present disclosure, but do not constitute any limitation to the present disclosure. Among the drawings.

DETAILED DESCRIPTION

Hereunder, some preferred embodiments of the present disclosure will be described with reference to the accompanying drawings. It should be appreciated that the embodiments described herein are only provided to describe and interpret the present disclosure and do not constitute any limitation to the present disclosure.

Figure 1:
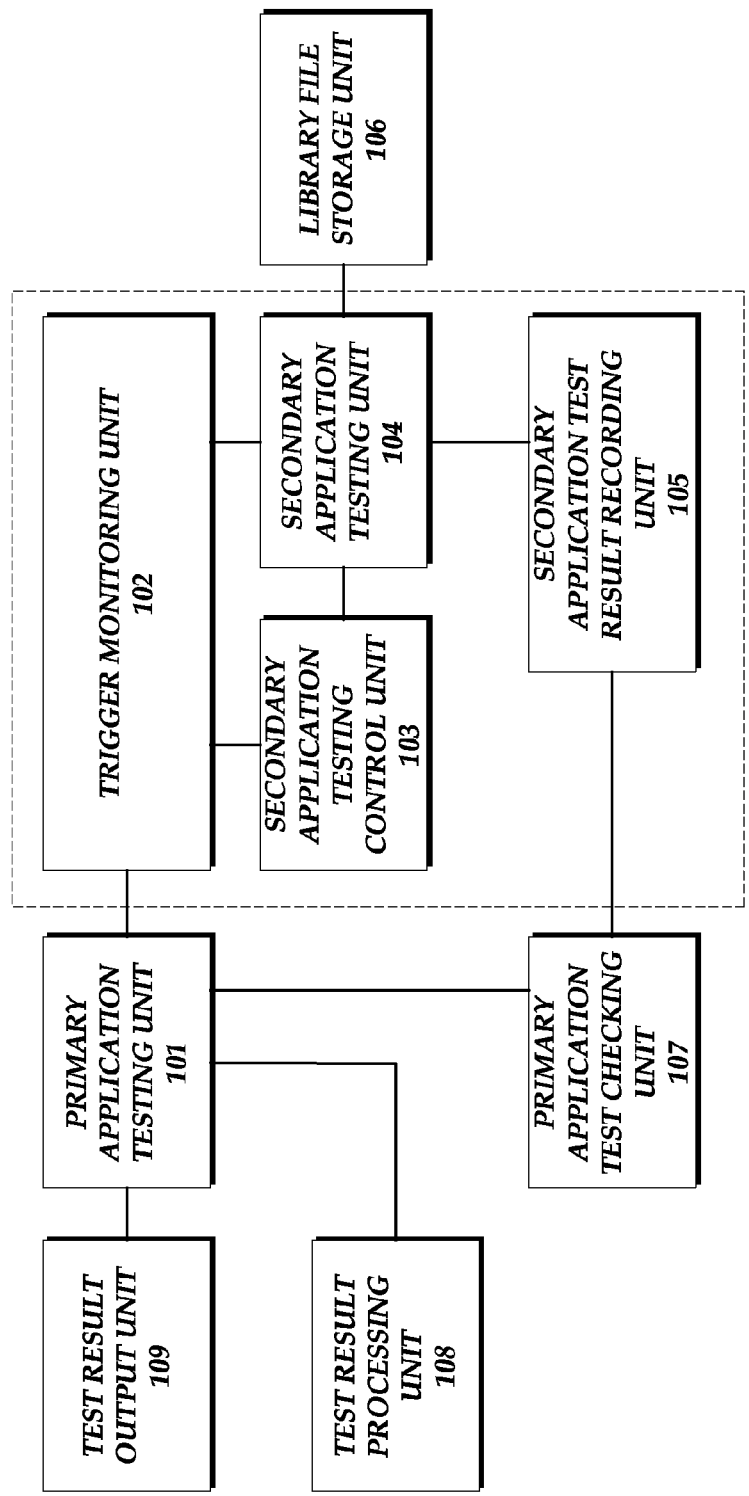
FIG. 1 is a functional block diagram of the Android automated cross-application testing device provided in the present disclosure.

FIG. 1 is a functional block diagram of the Android automated cross-application testing device provided in the present disclosure. The Android automated cross-application testing device may be any computing device, such as a portable device. The Android automated cross-application testing device may implement the methods of FIGS. 2 and 3 described below. As shown in FIG. 1, the Android automated cross-application testing device provided in the present disclosure comprises a primary application testing unit 101, a trigger monitoring unit 102, a secondary application testing control unit 103, a secondary application testing unit 104, a secondary application test result recording unit 105, a library file storage unit 106, a primary application test checking unit 107, a test result processing unit 108, and a test result output unit 109. The units provided in the Android automated cross-application testing device can be implemented by one or more computing devices.

The primary application testing unit 101 is configured to start up an Instrumentation process by means of command line to test the primary application, collect the test result of the primary application, and trigger and start up secondary applications in the testing process.

The trigger monitoring unit 102 is configured to monitor the triggering and starting up of a secondary application executed by the primary application testing unit 101 in the testing process of the primary application and send the triggering and starting information to the secondary application testing control unit 103. In addition, the trigger monitoring unit 102 can monitor the triggering and starting of any subordinate application in the testing process of a secondary application testing unit 104 and send the triggering and starting information to the secondary application testing control unit 103.

The secondary application testing control unit 103 is configured to receive the triggering and starting information sent from the trigger monitoring unit 102 and to control the application testing process of a secondary application testing unit 104.

The secondary application testing unit 104 is configured to accept the control of the secondary application testing control unit 103, test a secondary application and subordinate applications, and record and save the collected test result of the applications via the secondary application test result recording unit 105.

The library file storage unit 106 is configured to store a cross-application trefoil.jar (Method Library of Test Runner Enhancement Framework Open Innovative Layout), which provides an external interface of Test Runner Enhancement Framework Open Innovative Layout Instrumentation, so as to implement the functions of the trigger monitoring unit 102, the secondary application testing control unit 103, the secondary application testing unit 104, and the secondary application test result recording unit 105.

The primary application test checking unit 107 is configured to check whether the secondary application test result recording unit 105 generates the test result of the secondary application and submits the test result to the test result processing unit 108.

The test result processing unit 108 is configured to process the test result submitted by the secondary application test checking unit 107. The primary application testing program regularly checks whether the test result of the application is generated within a specified timeout duration. If the test result of the application is generated within the specified timeout duration, the test of the primary application will be continued. If the test result of the application is not generated within the specified time duration, the test of the primary application will be terminated, the execution of the current test case will be deemed as failed, and the test result will be "Timeout."

The test result output unit 109 is configured to output the test result of the primary application collected by the primary application testing unit 101 in the form of a test report.

Figure 2:
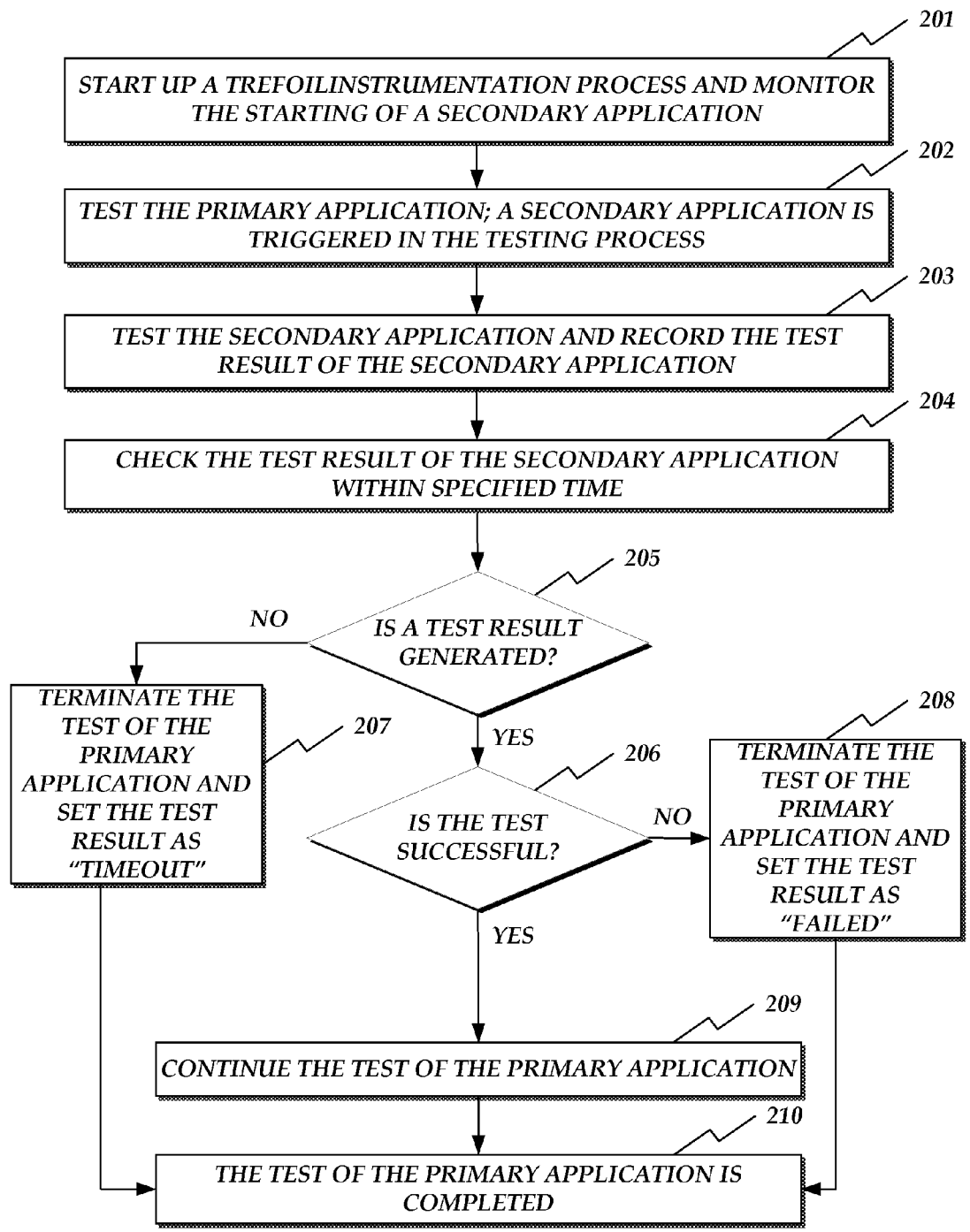
FIG. 2 is a flow diagram of the Android automated cross-application testing method provided in the present disclosure.

FIG. 2 is a flow diagram of the Android automated cross-application testing method provided in the present disclosure. The method of FIG. 2 can be implemented by a testing device, such as the testing device illustrated in FIG. 1. Hereunder, the Android automated cross-application testing method provided in the present disclosure will be described in detail with reference to FIG. 2.

First, in block 201, a TrefoilInstrumentation test command is started up for secondary applications by means of command line to start up a TrefoilInstrumentation process and monitor the starting of a secondary application.

In block 202, an Instrumentation test command is started up for a primary application by means of command line to start up the test of the primary application. In addition, a secondary application is triggered in the testing process.

In block 203, the trigger monitoring unit 102 detects that a secondary application is triggered in the testing process of the primary application. The secondary application testing control unit 103 controls a secondary application testing unit 104 to start up so as to test the secondary application, and saves the collected test result of the application to the secondary application test result recording unit 105.

In block 204, the primary application test checking unit 107 regularly checks whether the test result of the secondary application is generated within a specified timeout duration and sends the check result to the test result processing unit 108.

In block 205, the test result processing unit 108 determines whether the test result of the secondary application is generated. If the test result of the secondary application is generated, block 206 will be executed. Otherwise, the process will jump to block 207.

In block 206, the test result processing unit 108 determines whether the test is successful. If the test is determined to be successful, the process will jump to block 209. Otherwise, the next block will be executed.

In block 207, if the primary application test checking unit 107 ascertains that no test result of the secondary application is generated within the specified timeout duration, the test result processing unit 108 outputs the test result as "Timeout" and the process jumps to block 210.

In block 208, if the primary application test checking unit 107 ascertains that the test of the secondary application failed, the test result processing unit 108 outputs the test result as "Failed," and the process jumps to block 210.

In block 209, the test result processing unit 108 notifies the primary application testing unit 101 to continue the test of the primary application.

In block 210, the test of the primary application is terminated and the test result output unit 109 outputs a corresponding test report.

Figure 3:
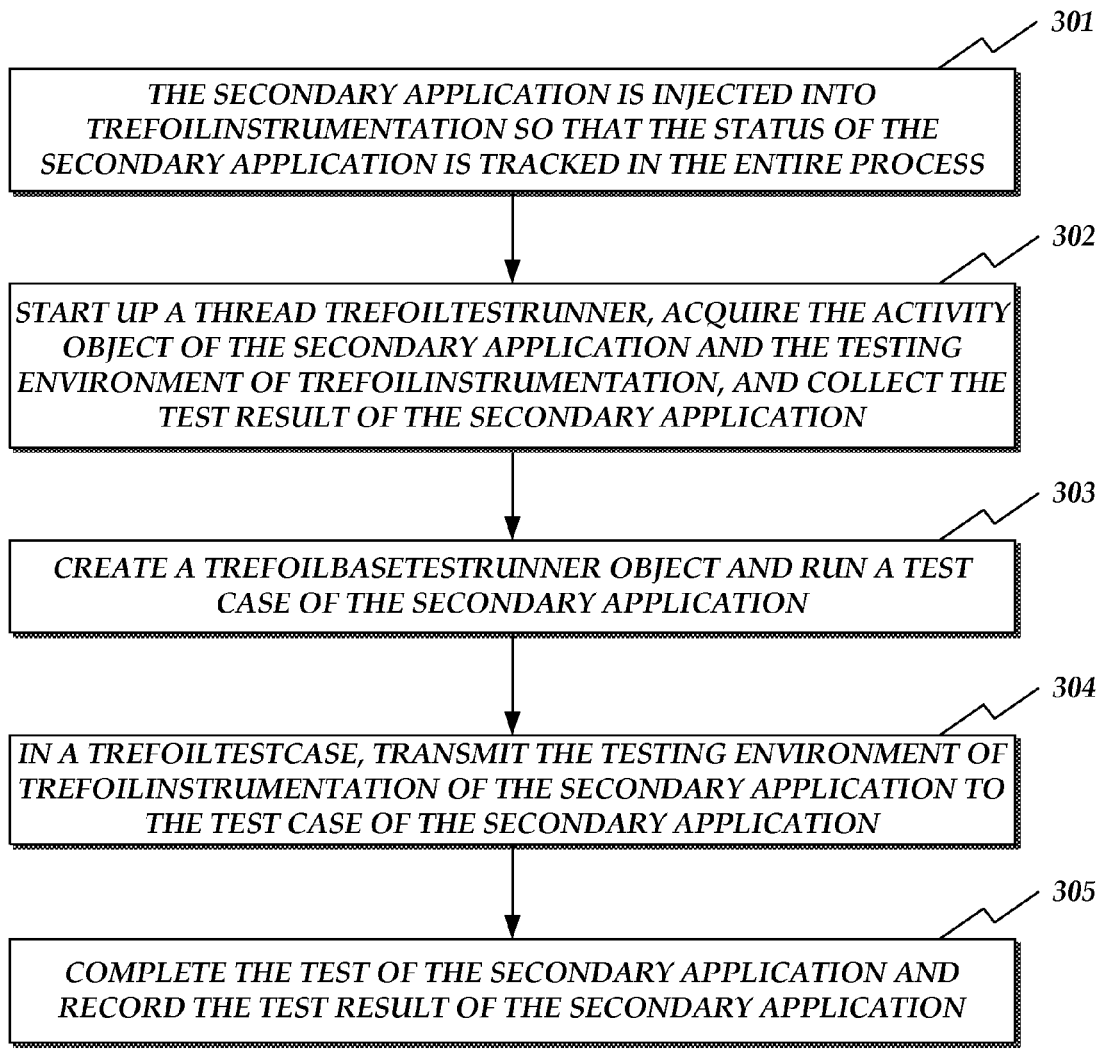
FIG. 3 is a testing flow diagram of a secondary application in the present disclosure.

FIG. 3 is a testing flow diagram of a secondary application in the present disclosure. The method of FIG. 3 can be implemented by a testing device, such as the testing device illustrated in FIG. 1. Hereunder, the testing process of a secondary application in the present disclosure will be described in detail with reference to FIG. 3.

First, in block 301, the trigger monitoring unit 102 detects that a secondary application is triggered in the testing process of the primary application. The secondary application testing control unit controls a secondary application testing unit to start up and the secondary application is injected into TrefoilInstrumentation so that the status of the secondary application is tracked by TrefoilInstrumentation in the entire process.

In block 302, a thread Test Runner Enhancement Framework Open Innovative Layout Test Runner (TrefoilTestRunner) is started up, the Activity object of the secondary application and the testing environment of TrefoilInstrumentation are acquired, and the test result of the secondary application is collected and sent to the secondary application test checking unit 106.

In block 303, a Test Runner Enhancement Framework Open Innovative Layout Base Test Runner (TrefoilBaseTestRunner) object is created and a test case of the secondary application is run.

In block 304, in a Test Runner Enhancement Framework Open Innovative Layout Test Case (TrefoilTestCase), the testing environment of TrefoilInstrumentation of the secondary application is transmitted to the test case of the secondary application.

In block 305, the test of the secondary application is completed, the test result of the secondary application is recorded, and the test of the primary application is continued.

With the Android automated cross-application testing device and method provided in the present disclosure, a cross-application test can be implemented (e.g., a secondary application can trigger and start up a subordinate application) and then the TrefoilInstrumentation process can start up the entire test process of the subordinate application, and so on.

For example, in a test scenario, a phone number is received from a short message. The phone number is saved to an address book and then the phone number is dialed from the address book. That test scenario involves three applications: an SMS application, an address book application, and a telephony application.

The TrefoilInstrumentation processes of the telephony application and the address book application may be started. Then, the two applications are injected into their TrefoilInstrumentation processes respectively, and the TrefoilInstrumentation processes monitor the status of the two applications.

The testing program of the SMS application may be started. The address book application is triggered and started up in the testing process of the SMS application. When the TrefoilInstrumentation process of the address book application that monitors the address book application is triggered, the testing program of the address book application will be started up immediately. Now, the testing process of the SMS application enters into a waiting status until the testing process of the address book application returns the test result or no test result of the address book application within a specified timeout duration. Thereby, the test of the address book application times out and fails. Similarly, if the telephony application is triggered and started up in the testing process of the address book application, the TrefoilInstrumentation process of the telephony application will start up the testing program of the telephony application.

After the testing processes of the address book application and telephony application generate test results, the testing process of the SMS application will stop waiting and the testing steps will continue until all the testing steps are completed.

Those skilled in the art should appreciate: the embodiments described above are only some preferred embodiments of the present disclosure and should not be deemed as constituting any limitation to the present disclosure. Though the present disclosure is described and illustrated in detail with reference to the embodiments, the present disclosure is not limited to these embodiments. Those skilled in the art can easily make modifications to the technical solution described above in the embodiments or make equivalent replacement of some technical features. However, any modification, equivalent replacement, or refinement to the embodiments without departing from the spirit and principle of the present disclosure shall be deemed as falling into the protected scope of the present disclosure.

Many other variations than those described herein will be apparent from this disclosure. For example, depending on the embodiment, certain acts, events, or functions of any of the algorithms described herein can be performed in a different sequence, can be added, merged, or left out all together (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks, modules, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, any of the signal processing algorithms described herein may be implemented in analog circuitry. A computing environment can include any type of computer system, including, but not limited to, a computer system based on a microprocessor, a mainframe computer, a digital signal processor, a portable computing device, a personal organizer, a device controller, and a computational engine within an appliance, to name a few.

The steps of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of non-transitory computer-readable storage medium, media, or physical computer storage known in the art. An exemplary storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments of the inventions described herein can be embodied within a form that does not provide all of the features and benefits set forth herein, as some features can be used or practiced separately from others.

What is claimed is:

1. An Android automated cross-application testing device, comprising:
   a primary application testing unit configured to test a primary application, collect a test result of the primary application, and trigger and start up a secondary application in a testing process;
   a trigger monitoring unit configured to monitor the triggering and starting up of the secondary application in the testing process;
   a secondary application testing control unit configured to control the testing process of the secondary application;

a secondary application testing unit configured to test the secondary application and subordinate applications, and collect test results of the secondary application and the subordinate applications;

a secondary application test result recording unit configured to record and save the test results of the secondary application or the subordinate applications;

a library file storage unit configured to store a cross-application Method Library of Test Runner Enhancement Framework Open Innovative Layout;

a primary application test checking unit configured to check the test results of the secondary application or the subordinate applications;

a test result processing unit configured to process the test result of the primary application; and a test result output unit configured to output the test result of the primary application collected by the primary application testing unit in the form of a test report.

2. The Android automated cross-application testing device of claim 1, wherein when the trigger monitoring unit detects that the secondary application is triggered and started up in the testing process, the secondary application testing control unit is configured to instruct the secondary application testing unit to test the secondary application.

3. The Android automated cross-application testing device of claim 1, wherein the cross-application Method Library of Test Runner Enhancement Framework Open Innovative Layout provides an external interface of Test Runner Enhancement Framework Open Innovative Layout Instrumentation to implement functions of the trigger monitoring unit, the secondary application testing control unit, the secondary application testing unit, and the secondary application test result recording unit.

4. An Android automated cross-application testing method, the method comprising:
- monitoring a starting of a secondary application in a primary application testing process;
- testing the secondary application;
- collecting and processing a test result of the secondary application;
- continue testing the primary application if the test of the secondary application is successful;
- repeating the above steps until the test of the primary application is complete; and
- terminating the test of the primary application if the test of the secondary application times out or fails.

5. The Android automated cross-application testing method of claim 4, wherein monitoring the starting of the secondary application comprises starting up a Test Runner Enhancement Framework Open Innovative Layout Instrumentation process using a command line.

6. The Android automated cross-application testing method of claim 4, wherein testing the secondary application further comprises:
- injecting the secondary application into a Test Runner Enhancement Framework Open Innovative Layout so that a status of the secondary application is tracked by the Test Runner Enhancement Framework Open Innovative Layout;
- starting up a thread Test Runner Enhancement Framework Open Innovative Layout Test Runner;
- acquiring an Activity object of the secondary application and a testing environment of TrefoilInstrumentation;
- collecting the test result of the secondary application;
- creating a Test Runner Enhancement Framework Open Innovative Layout Base Test Runner object and running a test case of the secondary application;
- transmitting a testing environment of the Test Runner Enhancement Framework Open Innovative Layout to the test case of the secondary application in a Test Runner Enhancement Framework Open Innovative Layout Test Case;
- completing the test of the secondary application;
- recording the test result of the secondary application; and
- continue testing the primary application.

7. The Android automated cross-application testing method of claim 4, wherein collecting and processing the test result of the secondary application further comprises:
- outputting the test result of the secondary application as "Timeout" and terminating the test of the primary application if the test result of the secondary application is not generated within a specified time; and
- terminating the test of the primary application if the test result of the secondary application is "Failed" within a specified time.

* * * * *